April 28, 1931.  A. S. HUGHES ET AL  1,802,427
FRAME MOUNTING FOR TRACTORS
Filed Nov. 10, 1927
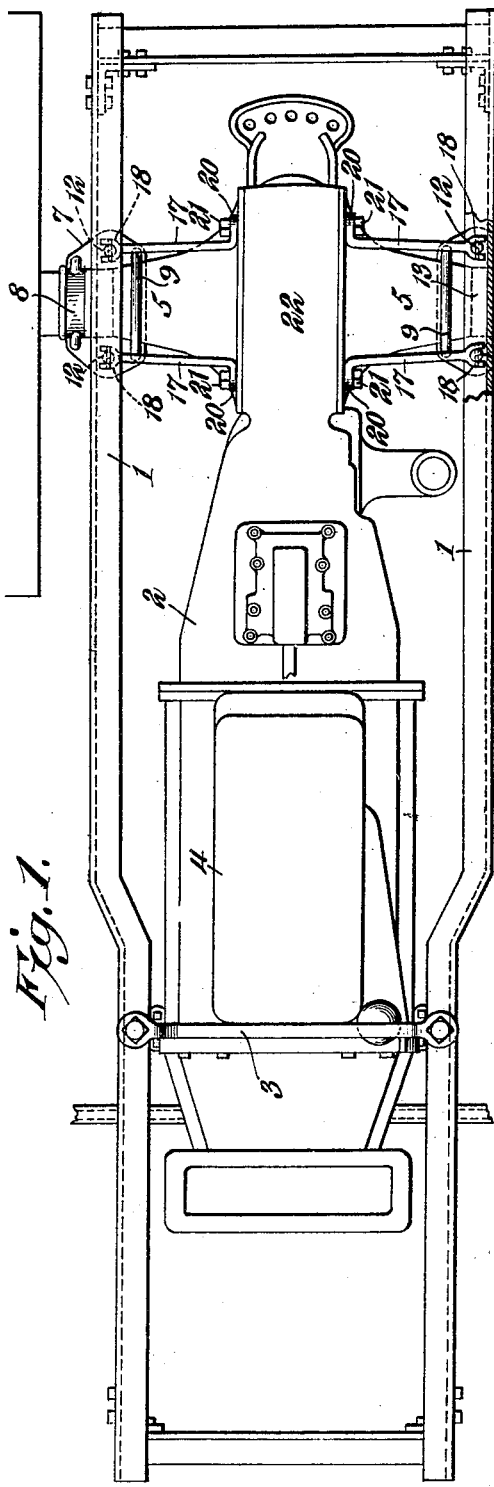
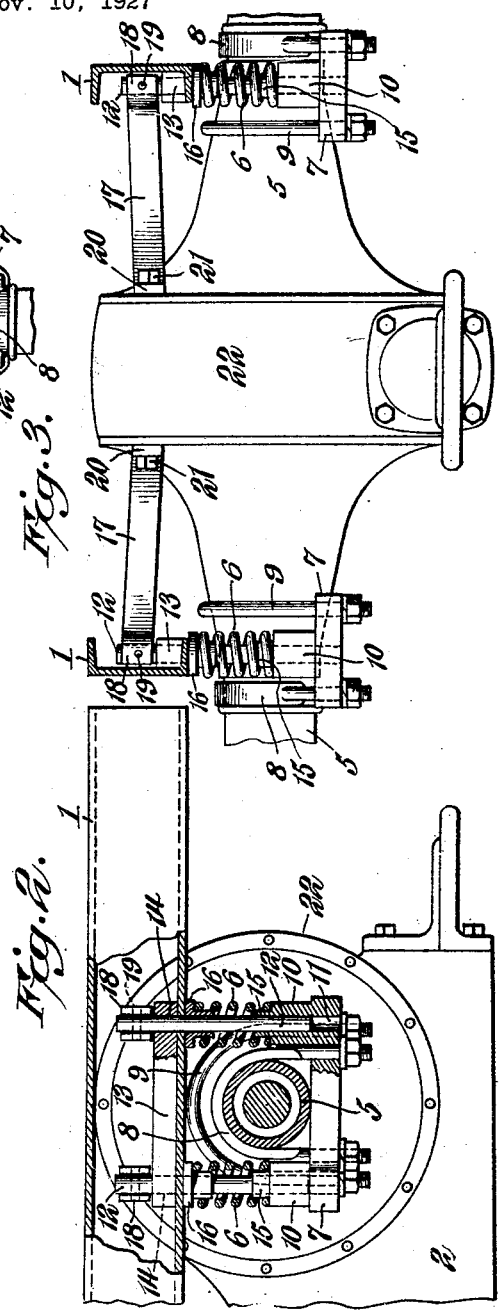
Arthur S. Hughes
and Howard F. Gorsuch, INVENTORS
BY
Siggers & Adams,
ATTORNEYS Patented Apr. 28, 1931

1,802,427

UNITED STATES PATENT OFFICE

ARTHUR S. HUGHES AND HOWARD F. GORSUCH, OF MANSFIELD, OHIO, ASSIGNORS TO THE HUGHES-KEENAN COMPANY, OF MANSFIELD, OHIO, A CORPORATION OF OHIO

FRAME MOUNTING FOR TRACTORS

Application filed November 10, 1927. Serial No. 232,388.

This invention relates to improvements in frames superimposed upon tractors or other vehicles for supporting various kinds of apparatus or carrying heavy loads, and among other objects, aims to provide means for cushioning that end of the frame nearest the rear axle housings of the tractor or vehicle and for preventing any longitudinal or transverse movement of the frame relative to the tractor during up and down movements of the frame on the tractor.

In the accompanying drawings showing a preferred embodiment of the invention:

Fig. 1 is a plan view showing a frame superimposed upon a tractor and cushioned by the improved means;

Fig. 2 is a detail longitudinal sectional view illustrating the resilient connection between one of the frame bars and the rear axle housings of the tractor;

Fig. 3 is a transverse sectional view taken in rear of the rear axle housings.

Referring more particularly to the drawings, the side bars or members 1 of a substantially rectangular frame are shown, said frame being mounted in a substantially horizontal position upon a tractor 2, which may be of various commercial forms. The frame members are preferably formed of relatively heavy channels which lie normally in a plane above the frame or trunk of the tractor to which they may be rigidly connected by any suitable means, or by means of a resilient saddle, such as indicated at 3 in the drawing. This saddle may have the form of the saddle forming part of the subject matter of a co-pending application filed by us, Serial No. 232,387, and may be similarly applied to the tractor immediately in advance of the motor 4, as shown in Fig. 1 of the drawing, and connected to the frame so as to support the front end thereof. The form of resilient saddle shown and described in another co-pending application filed by us, Serial No. 232,386, may be employed in connection with the present invention, said cushioning means being applied to the circumferential flanges joining the front and rear sections of the tractor trunk and connected to the frame substantially midway between the front and rear ends thereof.

The channels 1 cross above the rear axle housings 5 of the tractor and are resiliently connected to the same, adjacent to the traction wheels, in a manner effectually to relieve the transmission and rear axle housings of undue strains from the excessive jars and shocks incident to the heavy duty to which the machine may be subjected. To this end coiled springs 6 are interposed between the frame and a supporting plate or block 7 at either side of the machine, said plate being rigidly held to the under side of the axle housing by means of outer and inner clips 8 and 9 respectively, which obviate the necessity of changing or altering the axle housings.

The ends of the blocks or plates 7 are preferably provided with integral, upstanding enlargements 10 having central bores or passageways 11 extending vertically therethrough and adapted to receive the lower ends of guide pins 12 and permit the same to freely slide therein. Secured upon the upper face of the lower, inturned flange of each channel iron 1, is an upper bearing plate 13 having vertical bores 14 adjacent to its ends; and registering bores in the lower flange of the channel iron permit the upper ends of the guide pins 12 to extend through and above the bearing plate 13, as clearly shown in Fig. 2.

Preferably the enlargements 10 are provided on their upper ends with reduced extensions 15 adapted to snugly fit within the lower ends of the springs 6 and prevent their contact with the vertically-movable pins, while the upper ends of said springs are similarly held by sleeves fitting within the springs and provided with flanges 16 to abut against the under sides of the channels when the superimposed frame, as above described, is subjected to a sudden load, such as through the operation of a dump body, or that of a hoisting device or other apparatus which may be mounted upon the frame, it will be seen that the springs 6 will effectually cushion the frame, thus obviating damage to the tractor unit.

The guide pins 12, which traverse the bores 11 and 14, will, in a measure, obviate lateral movement of the frame. It has been found, however, that additional means are advisable for bracing the rear end of the frame against lateral strains, while permitting cushioned up and down movements of the same. For this purpose bars 17 are provided, the same being located transversely of the tractor substantially parallel to each other and substantially horizontal and on a level with the channels 1. Each bar 17 is bifurcated at its outer end, as at 18, to straddle the upper end of the pin 12 where extending above the plate 13, said end being pivoted thereto by pins 19. The inner ends of the brace bars 17 are bent at right angles to provide attaching feet 20 which are bolted or otherwise secured, as at 21, to the circular flanges of the axle housings 5 where the latter are connected to the transmission housing 22 of the tractor. The bolts 21 are preferably fitted into certain of the usual bolt openings already present in the tractor, and such connection is of sufficient strength to permit the frame to move vertically during the cushioning action and to hold the guide pins practically stationary. The springs 6 are of sufficient strength to permit only a limited downward movement of the frame so as not to contact with the rear axle housings; and the rebound of the frame, by reason of the extreme weight upon the same, is not sufficient to strain the bolts 21 unduly or to withdraw the lower ends of the pins 12 from the bores 11.

From the foregoing, it will be seen that efficient and practical means have been provided for protecting the operative parts of a tractor from blows or jars imparted to a superimposed frame, said means preventing undue straining of the parts and at the same time having elements to permit the cushioned frame to move upwardly and downwardly in a straight path relative to the tractor; the entire frame and cushioning and bracing means being applied to the tractor without any alteration or change in the latter.

Obviously the present invention is not restricted to the particular embodiment thereof herein shown and described. Moreover, it is not indispensable that all the features of the invention be used conjointly, since they may be employed advantageously in various combinations and subcombinations.

What is claimed is:—

1. In combination with a tractor, a frame mounted on the tractor to be supported thereby; resilient means for cushioning the rear end of the frame upon the rear axle housings of the tractor; and means extending transversely of the frame and connected to the tractor and frame so that a limited vertical swinging movement is permitted, said means being rigid and the connections being non-yielding to tensile stresses, so that said means prevents lateral movement of the frame relative to the tractor, while permitting some vertical movement of the frame.

2. In combination with a tractor; a frame mounted on the tractor to be supported thereby; means for connecting the front portion of the frame to the front portion of the tractor; resilient means for cushioning the rear end of the frame on the rear axle housings of the tractor; and arms extending transversely of the frame and having their inner ends connected to the transmission housing of the tractor and their outer ends co-operating with the cushioning means to prevent lateral movement of the frame when the cushioning means function.

3. In combination with a tractor; a frame having side bars adapted to be supported on the tractor; means connecting one end portion of the frame to the radiator end of the tractor; supporting plates carried by the rear axle housings; coiled springs interposed between the side bars and the supporting plates; pins extending through the springs and vertically slidable in the side bars and plates; and braces connected to the tractor on opposite sides and pivoted to the upper ends of the pins to prevent lateral movement of the frame relative to the tractor.

4. In combination with a tractor; a frame mounted on the tractor and having side bars; means for supporting one end of the frame on the radiator end of the tractor; guide pins secured to and projecting above the rear axle housing of the tractor and slidable in the side bars; coiled springs surrounding the guide pins to cushion the downward movement of the frame; and arms connected at their inner ends to the transmission housing of the tractor and hinged at their outer ends to the upper ends of the guide pins.

5. In a tractor frame mounting, the combination of a duplex coil spring support secured to the rear axle housing of the tractor at each side of the tractor; a pair of vertical coil springs on each side of said axle housing and interposed between the frame and the spring support; means to hold said springs substantially vertical; and means directly connecting the transmission housing of the tractor with said spring holding means so as to permit limited vertical movement of the frame cushioned by the springs, but obviating lateral movement of the frame relative to tractor.

6. In a tractor frame mounting, the combination of a duplex coil spring support secured to the rear axle housing of the tractor at each side of the tractor; a pair of vertical coil springs on each side of said axle housing and interposed between the frame and the spring support; means to hold said springs substantially vertical; and braces pivoted upon each spring holding means to swing in a vertical plane substantially at right angles to the longitudinal axis of the frame; and means connecting each brace to the tractor adjacent its transmission housing so as to be capable of very limited swing vertically.

7. In combination with a tractor, a frame mounted on the tractor, said frame including longitudinal bars; means for supporting the frame on the radiator end of the tractor; a pair of plates secured beneath the rear axle housings of the tractor and extending longitudinally of the tractor beneath the longitudinal bars of the frame; a pair of vertical pins passing through the longitudinal bars on each side of the tractor and through bores at opposite ends of each plate; coil springs surrounding said pins interposed between the frame and the plate on each side of the tractor; and four bars extending transversely of the frame above the rear axle housings, each bar being pivoted at its outer end to the upper end of one of said pins and each bar being secured to the circular flanges of the rear axle housings where the latter are connected to the transmission housing of the tractor; said bars preventing any lateral movement of said frame.

In testimony, that we claim the foregoing as our own, we have hereto affixed our signatures.

ARTHUR S. HUGHES.
HOWARD F. GORSUCH.